(12) United States Patent
Rai et al.

(10) Patent No.: US 6,805,502 B2
(45) Date of Patent: Oct. 19, 2004

(54) METHOD FOR DETERMINING OPTIMAL BATCH SIZES FOR PROCESSING PRINT JOBS IN A PRINTING ENVIRONMENT

(75) Inventors: Sudhendu Rai, Fairport, NY (US); Samaresh C. Maitra, Webster, NY (US)

(73) Assignee: Xerox Corporation, Stamford, CT (US)

( * ) Notice: Subject to any disclaimer, the term of this patent is extended or adjusted under 35 U.S.C. 154(b) by 294 days.

(21) Appl. No.: 09/767,976

(22) Filed: Jan. 23, 2001

(65) Prior Publication Data

US 2002/0124756 A1 Sep. 12, 2002

(51) Int. Cl.[7] .................................................. B41J 5/30
(52) U.S. Cl. ........................... 400/61; 400/76; 358/1.15; 358/1.9
(58) Field of Search ................................. 101/483, 484; 400/61, 62, 70, 76; 358/1.1–1.18

(56) References Cited

U.S. PATENT DOCUMENTS

| | | | |
|---|---|---|---|
| 4,887,218 A | 12/1989 | Natarajan | |
| 4,896,269 A | 1/1990 | Tong | |
| 4,956,784 A | 9/1990 | Hadavi et al. | |
| 4,974,166 A | 11/1990 | Maney et al. | |
| 5,093,794 A | 3/1992 | Howie et al. | |
| 5,229,948 A | 7/1993 | Wei et al. | |
| 5,918,226 A | 6/1999 | Tarumi et al. | |
| 5,946,661 A | 8/1999 | Rothschild et al. | |
| 6,263,253 B1 | 7/2001 | Yang et al. | |
| 6,278,901 B1 | 8/2001 | Winner et al. | |
| 6,293,714 B2 * | 9/2001 | Noda | 400/61 |
| 2002/0101604 A1 * | 8/2002 | Mima et al. | 358/1.15 |

FOREIGN PATENT DOCUMENTS

| | | | | |
|---|---|---|---|---|
| JP | 10143450 A * | 5/1998 | .......... | G06F/13/00 |
| JP | 2000322209 A * | 11/2000 | ............. | G06F/3/12 |

OTHER PUBLICATIONS

U.S. patent application Ser. No. 09/706,430, Rai et al., filed Nov. 3, 2000.
U.S. patent application Ser. No. 09/706,078, Squires et al., filed Nov. 3, 2000.
U.S. patent application Ser. No. 09/735,167, Jackson et al., filed, Dec. 12, 2000.
U.S. patent application Ser. No. 09/771,740, Garstein, filed Jan. 29, 2001.
Hopp, Wallace J. and Spearman, Mark L., *Factory Physics: Foundations of Manufacturing Management*. McGraw–Hill Professional Book Group, Boston, Massachusetts. ISBN: 0–256–15464–3; pp. 153–156; 323–325; 462–485 (Sep. 1995).
Luqi, et al., *a Prototyping Language for Real–Time Software*. IEEE Transactions on Software Engineering, vol. 14, No. 10, Oct. 1988, pp. 1409–1423.
*ADF or LDF? Introducing the Lean Document Factory I*, Xerox Corporation, Power Point Presentation, Nov. 4, 1999.
*ADF or LDF? Introducing the Lean Document Factory II*, Xerox Corporation, Power Point Presentation, Nov. 4, 1999.
Rai, Sudhendu, Xerox Corporation, *Print Shops as Document Factories, The Future of Manufacturing: New Developments in Technology and System Design;* Massachusetts Institute of Technology; Power Point Presentation, Apr. 19, 2000, pp. 1–18.

(List continued on next page.)

Primary Examiner—Minh H Chau
(74) Attorney, Agent, or Firm—Fay, Sharpe, Fagan, Minnich & McKee, LLP

(57) ABSTRACT

A print job is partitioned into sub-jobs or "batches" to shorten the turnaround time for completing the processing of the print job. The sizes of the batches are chosen so as to minimize the turnaround time. The batch sizes are optimized based on factors affecting the turnaround time. The batches may be processed concurrently in a pipelined fashion to minimize the turnaround time.

11 Claims, 3 Drawing Sheets

OTHER PUBLICATIONS

Gershwin, Stanley and Rai, Sudhendu, *Application and Extension of Manufacturing Systems Engineering Techniques to Print Shops*; Dept. of Mechanical Engineering, Massachusetts Institute of Technology, and Wilson Center for Research Technology, Xerox Corporation; Power Point Presentation; Sep. 29, 1999, pp. 1–15.

Gershwin, Stanley B., *Manufacturing Systems Engineering*, Prentice Hall, 1994.

*Cellular Manufacturing: One–Piece Flow for Workteams*, ISBN: 156327213X, Productivity Press Inc.; Apr. 1999.

Wu, N., *A Concurrent Approach to Cell Formation and Assignment of Identical Machines in Group Technology*, Int. J. Prod., Res., 1998, vol. 36, No. 8, 2099–2114; Science Center, Shantou University, Shantou 515063, China.

* cited by examiner

US 6,805,502 B2

METHOD FOR DETERMINING OPTIMAL BATCH SIZES FOR PROCESSING PRINT JOBS IN A PRINTING ENVIRONMENT

TECHNICAL FIELD OF THE INVENTION

The present invention relates generally to printing and more particularly to determining optimal batch sizes for processing jobs in a printing environment.

BACKGROUND OF THE INVENTION

Conventional printshops are organized in a fashion that is functionally independent of print job complexity, print job mix, and total volume of print jobs. Typically, related equipment is grouped together. Thus, all printing equipment is grouped and located in a single locale. Similarly, all finishing equipment is grouped and located in a single locale. In other words, conventional printshops organize resources into separate departments, where each department corresponds to a type of process or operation that is performed to complete a print job.

When a print job arrives from a customer, the print job sequentially passes through each department. Once the print job is completely processed by a first department, the print job gets queued for the next department. This approach continues until the print job is completed. Unfortunately, this conventional approach leads to significant time delays and increased work-in-progress and inventory costs.

SUMMARY OF THE INVENTION

The present invention addresses the above-described limitations of conventional approaches to processing print jobs in a printshop. In particular, the present invention provides an approach to optimally dividing a print job into sub-jobs or "batches." The batches may then be separately processed so as to optimize the total turnaround time it takes to complete the processing of the print job. The present invention selects an optimal batch size for batches so as to reduce the total turnaround time for the print job. The optimal batch size may vary depending on whether a print job is processed as a serial sequence of operations without assembly operations or whether the print job involves assembly operations.

In accordance with one embodiment of the present invention, a method is practiced in a printing environment, such as a printshop or lean document factory, that has equipment for processing print jobs. In accordance with the method, the selected print job is received and divided into batches. The size of each of the batches is selected to substantially optimize the time period it takes for the selected print job to be fully processed. In many cases, the batch size may be selected to be purely optimal, however, in other instances, the batch size may be selected to be merely substantially optimal. The batches are processed separately and concurrently to complete processing of the print job.

In accordance with another aspect of the present invention, a method of optimizing the printing of a print job is performed in a printshop. Each operation that is required to complete the print job is identified. The print job is for a specified number of production items. A processing time required for each operation per production item is determined along with an inter-batch handling time that is required to switch between batches for each operation. A setup time for each operation is determined. Based on the processing times, the inter-batch handling times and setup times for the operators, the batch sizes of batches for the print job are determined.

In accordance with an additional aspect of the present invention, a method is practiced in a printshop such that a print job is represented as a sequence of interconnected nodes. Each node represents an operation, and the nodes are interconnected by edges representing workflow between operations. Paths are identified in the sequence of nodes and edges wherein the paths extend from an initial node (that has no predecessor nodes interconnected to it) to a last node (that has no successor nodes interconnected to it) in the sequence of interconnected nodes representing the print job. A critical path is identified among the paths. The critical path is the one that takes the longest amount of time to complete processing of a batch. The print job is divided into batches of given batch sizes for processing by the printshop. The batch sizes are chosen to optimize processing time for the critical path.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides an approach to optimizing batch size for batches of a print job that are processed in a printing environment. In particular, selected print jobs may be divided into smaller sized subcomponents known as "batches." The batches may be concurrently processed in a pipelined fashion to ensure higher overall utilization of resources and faster turnaround times for print jobs. The batch sizes are chosen to decrease the total time it takes to process the print job.

For purposes of the discussion below, a "print shop" refers to a grouping of printing resources. The printshop may be a freestanding entity such as a commercial printer or may be part of a corporation or other entity. A "print job" refers to a logical unit of work that is to be completed for a customer. For example, a request to make 100 copies of a document constitutes a print job. Similarly, a request to print one thousand copies of a book is a print job.

Figure 1:
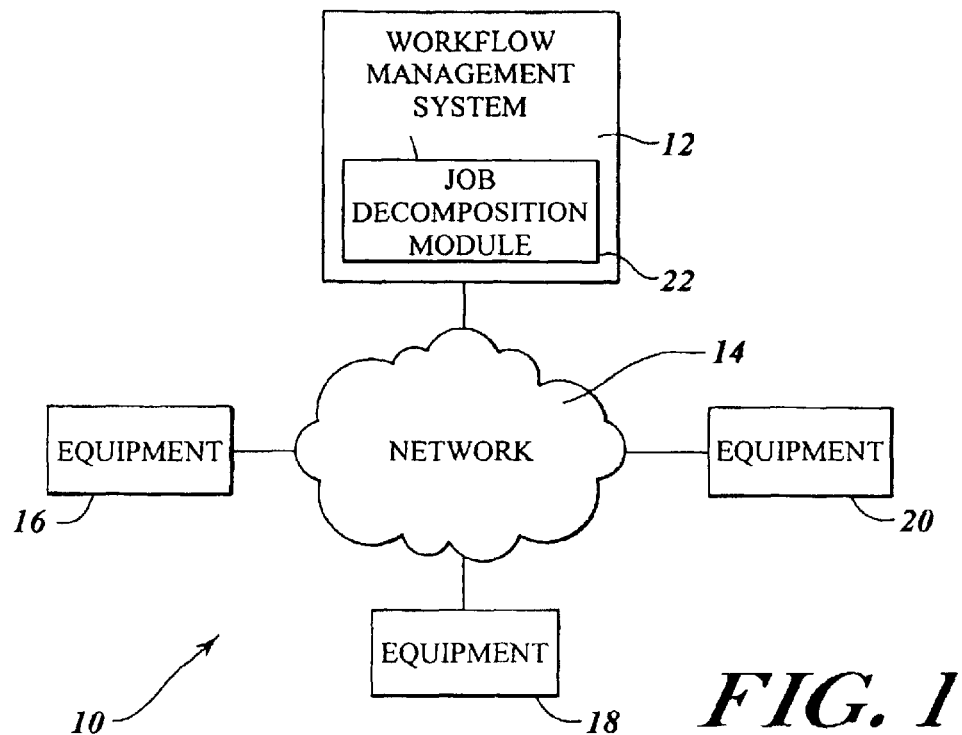
FIG. 1 depicts an environment suitable for practicing the illustrative embodiment of the present invention.

FIG. 1 depicts an environment suitable for practicing the illustrative embodiment of the present invention. The printing environment 10 includes a workflow management system 12 that is responsible for managing workflow in the printing environment. The printing environment also includes equipment 16, 18 and 20 for completing the print job. The equipment may be of many different varieties. For example, the equipment may include a printer, a copier, a binder, a hole-punch, a collator, a sealer, a shrink-wrapper or any other variety of equipment that is used in completing and processing print jobs. In the example depicted in FIG. 1, a network 14 interconnects the equipment 16, 18 and 20 with the workflow management system 12. Nevertheless, those skilled in the art will appreciate that the present invention may also be practiced in environments where there is no network connection between the equipment and the workflow management system. The network 14 may be a local area network (LAN) or may, instead, be formed by communication links that interconnect the equipment 16, 18 and 20 and the workflow management system 12.

Those skilled in the art will appreciate that the depiction of FIG. 1 is intended to be merely illustrative and not limiting of the present invention. The print shop may have more than three pieces of equipment or even less than three pieces of equipment. Moreover, the workflow management system does not need to have a communication path with the equipment; rather the batches may be manually assigned based or the optional batch size information obtained by the workflow management system 12.

The workflow management system 12 may be implemented on a stand-alone computer system, such as the server computer system or a workstation. Alternatively, the workflow management system 12 may be integrated into the printing equipment, such as a printer, copier or the like. Still further, the workflow management system 12 may be implemented by distributing components that are realized as separate electronic devices. The workflow management system 12 includes a job decomposition module 22. The job decomposition module is responsible for decomposing print jobs into "batches. Not all print jobs need to be decomposed into batches. For example, if a customer wants a single copy of a document, the print job will likely not be partitioned into separate batches.

The job decomposition module 22 may be realized in software, firmware, or even hardware. The job decomposition module 22 may be run in a distributed fashion or in a tightly coupled fashion. Those skilled in the art will appreciate that there are multiple possible implementation for the job decomposition module 22.

Figure 2:
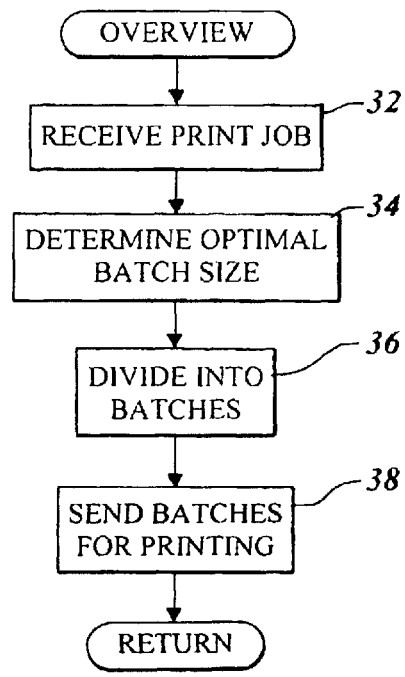
FIG. 2 is a flow chart that provides an overview of the steps performed to split print jobs into optimal sized batches.

FIG. 2 provides an overview of the steps that are performed in printing a print job in the illustrative embodiment of the present invention. Initially the print job is received at the workflow management system 12 (step 32 in FIG. 2). The workflow management system 12 then utilizes the job decomposition module 22 to determine the optimal batch size for batches of the print job (step 34 in FIG. 2). This process of determining the optimal batch size will be described in more detail below. The print job is divided into batches (step 36 in FIG. 2). The batches are subsequently fed into the printing pipeline (formed by the equipment 16, 18 and 20) so that the batches are concurrently processed (step 38 in FIG. 2).

Figure 3:
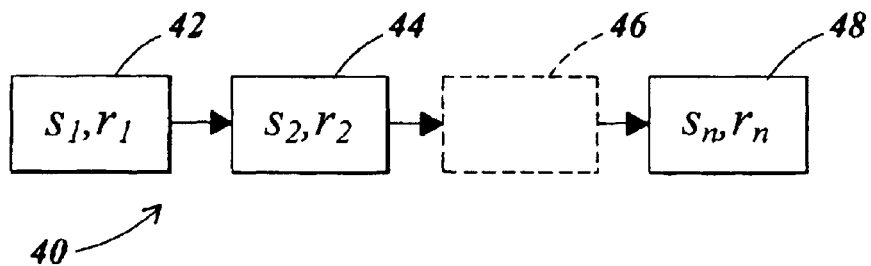
FIG. 3 depicts a graphical representation of a print job containing a serial sequence of operations without an assembly.

How the optimal batch sizes for print jobs are determined depends upon the nature of the workflow required for each print job. The work flow is the sequence of operations that need to be performed to complete the print job. FIG. 3 shows an example of a serial sequence print job. In the representation shown in FIG. 3, each node, 42, 44, 46 and 48 represent a respective operation that is to be performed in the print job. The edges connecting the nodes, 42, 44, 46 and 48 identify the flow and sequence of operations. Thus, operation 42 is first completed, followed by operation 44, which, in turn, is followed by operation 46, and so forth. In the example depicted in FIG. 3, node 46 is shown in phantom form to represent an aggregation of operations ranging from operation 3 to operation n-1. There are a total of n operations required by the print job.

An example is helpful to illustrate what is meant by the representation of FIG. 3. Suppose that the first operation to be performed on a print job is to print and further suppose that the next operation is to cut the paper that has been printed in the first operation. The final operation is to bind the document. For each production item, (e.g. a bound copy of the document) node 42 represents the printing of a production item. Node 42 represents the cutting of the printing paper for the production item. The arrow extending between node 42 and 44 note that the results of printing are passed to a cutting machine where the cutting occurs. The final operation 48 represents the binding of a production item.

Figure 4:
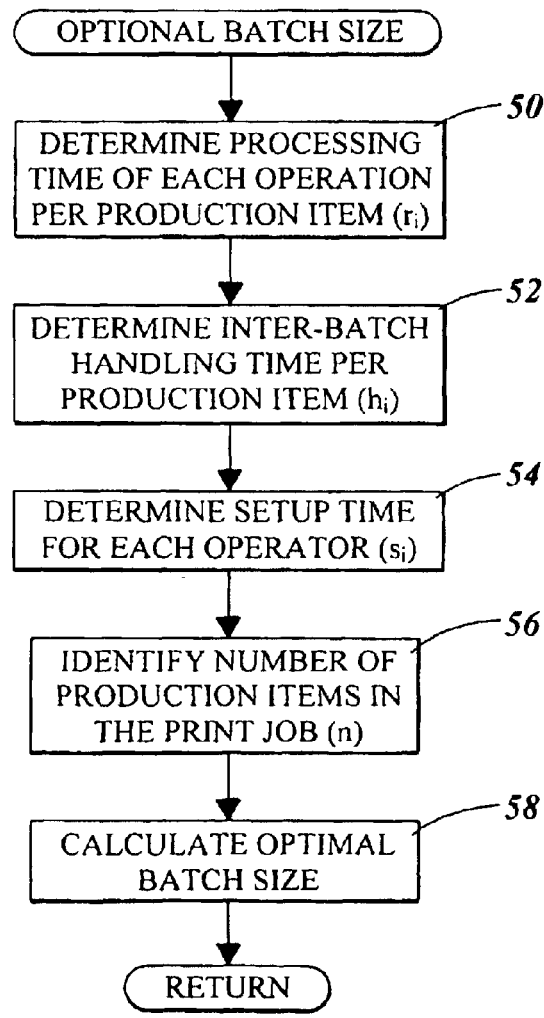
FIG. 4 is a flow chart illustrating the steps that are performed to determine optimal batch size.

FIG. 4 is a flow chart illustrating the steps that are performed to determine an optimal batch size for a serial print job, like that depicted in FIG. 3. Initially, the processing time of each operation per production item is determined (step 50 in FIG. 4). This processing time may be represented by the variable $r_i$. The i variable refers to the number of the operation in the sequence. Thus, for the first operation, i=1. The processing time refers to how long it takes to complete the operation per production item. For the example where a document is being printed and bound and the first operation is printing, $r_1$ equals the time it takes to print a single copy of the document. The inter-batch handling time per production item is also determined (step 52 in FIG. 4). Inter-batch handling time may be represented by the variable $h_i$. The inter-batch handling time refers to the time it takes to switch between batches for a given operation. Suppose that a print job involves the steps of printing and tape binding. After books have been printed, it takes time to unload the books and send the books to the tape binder before the printing of the next batch may be initiated. This time represents inter-batch handling time $h_i$.

The setup time for each operation must also be determined (step 54 in FIG. 4). This setup time may represented by the variable $S_i$. The setup time refers to the time it takes to setup or configure a piece of equipment to perform an operation. The setup time is specified on a per production item basis.

The number of production items in the print job must be identified (step 56 in FIG. 4). The number of production items may be represented by the variable N.

Those skilled in the art will appreciate that the ordering of the steps in FIG. 4 is not intended to imply a required sequence in which the variables must be determined; rather these variable may be determined in a different sequence and must just generally be known in order to calculate the optimal batch size.

Given the information gathered in steps 50, 52, 54 and 56, the optimal batch size for the print job may be then be determined (step 58 in FIG. 4).

In order to appreciate how the optimal batch size is calculated, it is useful to first express the total production time $T_{prod}$ as follows:

$$T_{prod} = \sum_{i=1}^{i=n} [br_i + h_i] + S_1 + [\max_i (br_i + h_i)]\left(\frac{N}{b} - 1\right)$$

where max ( ) is the maximization operator.

This expression of total production time include terms that specify the time taken to process the first batch followed by the time taken to process the subsequent batches. The optimal batch size is the batch size that minimizes $T_{prod}$. In the case where the term $[\max_i (br_i + h_i)]$ is independent of b, such as when there is one machine that dominates this term, the optimal batch size is given by the following expression:

$$b = \sqrt{\frac{\max_i(h_i)N}{\sum_{i=1}^{n} r_i - \max_i(r_i)}}$$

In instances where the term is not independent of b, the optimal batch size is computed using a mixed integer programming optimization algorithm, such as that found within the Microsoft Excel program. The mixed integer programming optimization algorithm evaluates the following expression as a function of b:

$$\min\left[\left(\sum_{i=1}^{i=n} [br_i + h_i] + S_1\right) + \left[\max_i(br_1 + h_i)\right]\left(\frac{N}{b} - 1\right)\right]$$

where min[ ] is the minimization operator.

Figure 5:
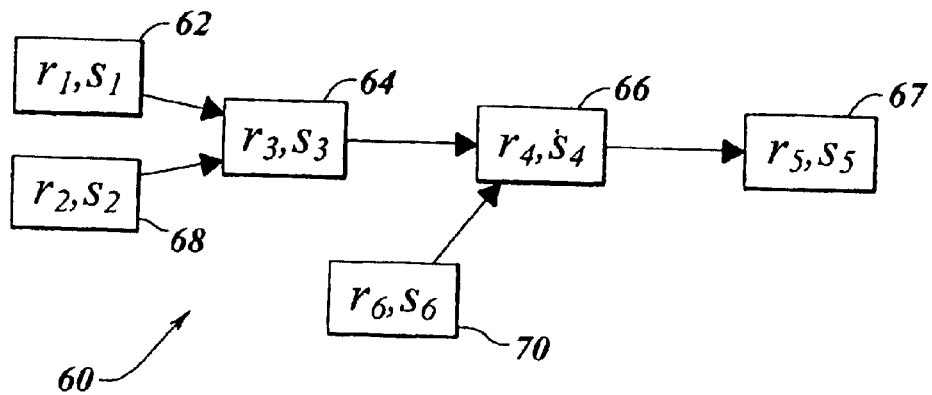
FIG. 5 is a graphical representation of a print job that has assembly operations.

The calculation of the optimal batch size may differ in cases where a print job involves an assembly. FIG. 5 shows an example of the graphical depiction of a print job that involves an assembly. In particular, the results of operation 62 and 68 must be assembled for operation 64. Similarly, the results of operation 64 and 70 must be assembled for operation 66.

Figure 6:
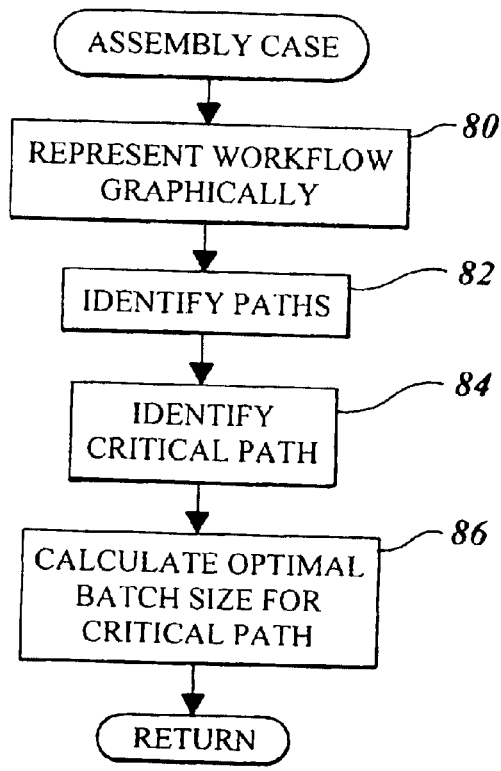
FIG. 6 is a flow chart illustrating steps that are performed when a print job has at least one assembly operation

FIG. 6 is a flow chart illustrating the steps that are performed when the print job involves at least one assembly step. The workflow for the print job is depicted graphically (step 80 in FIG. 6). Paths within the workflow are identified. For the example depicted in FIG. 5, the paths are those that extend from the root node 67 to the leaf nodes 62, 68 and 70, respectively. Thus, the first path includes nodes 67, 66, 64 and 62. The second path includes nodes 67, 66, 64 and 68, and the third path includes nodes 67, 66 and 70. A critical path among the paths must then be identified (step 84 in FIG. 6). The critical path is the path that takes the longest time to complete and thus will dominate the total time it takes to produce the print job. The optimal batch size is then calculated for the critical path (step 86 in FIG. 6). The optimal batch size may be calculated by applying the steps of FIG. 4 to the critical path.

While the present invention has been described with reference to an illustrative embodiment thereof, those skilled in the art will appreciate that various changes in form and detail may be made without departing from the intended scope of the present invention as defined in the appended claims.

What is claimed is:

1. In a printing environment having equipment for processing print jobs, a method, comprising the steps of:
    receiving a selected print job;
    dividing the selected print job into batches, where a size of each of the batches is selected to substantially optimize a time period it takes for the selected print job to be fully processed;
    to determine the total production time $T_{prod}$, which includes the time taken to process the first batch followed by the time to process the subsequent batches, use the following equation, where $r_i$ represents the processing time of each operation per production item, i represents the number of the operation in sequence, $r_1$ represents the time it takes to print a single copy of the document, $h_i$ represents the inter-batch handling time, $S_1$ represents the setup time for each operation, and N represents the number of production items in the print job:

$$T_{prod} = \sum_{i=1}^{i=n} [br_i + h_i] + S_1 + [\max(br_i + h_i)]\left(\frac{N}{b} - 1\right); \text{ and}$$

processing the batches separately and concurrently to complete processing of the print job.

2. The method of claim 1, wherein the size of each of the batches is based at least in part on the time it takes for the equipment to fully process each batch;
    to determine the optimal batch size, use the following equation:

$$b = \sqrt{\frac{\max_i(h_i)N}{\sum_{i=1}^{n} r_i - \max_i(r_i)}}.$$

3. The method of claim 1, wherein the size of each of the batches is based at least in part on the time it takes for the printing environment to switch from processing a first batch to processing a second batch for each operation that is required to complete the processing of the print job.

4. The method of claim 1, wherein the batches of the selected print job are all processed by a same group of the equipment in a serial sequence of operations.

5. The method of claim 1, wherein the size of each of the batches is chosen to fully optimize the time period it takes the selected print job to be fully processed.

6. The method of claim 1, wherein the selected print job entails at least one assembly where documents from multiple sources are assembled into a single entity.

7. The method of claim 1, wherein batch sizes are chosen to minimize total time required for complete printing of the print job.

8. A medium for storing instructions for performing a method in a printing environment having equipment for processing print jobs, comprising the steps of:
    receiving a selected print job;
    dividing the selected print job into batches, where a size of each of the batches is selected to substantially optimize a time period it takes for the selected print job to be fully processed, wherein the size of each of the batches is based at least in part on the time it takes for the printing environment to switch from processing a first batch to processing a second batch for each operation that is required to complete the processing of the print job; and
    processing the batches separately and concurrently to complete processing of the print job, wherein each batch is processed by a subset of the equipment.

9. The method of claim 8, wherein the size of each of the batches is based at least in part on the time it takes for the equipment to fully process each batch;
    whereby to determine the optimal batch size, the following equation is employed:

$$b = \sqrt{\frac{\max_i(h_i)N}{\sum_{i=1}^{n} r_i - \max_i(r_i)}}.$$

10. The medium of claim 8, wherein the subsets of each equipment that process the batches are mutually exclusive.

11. The medium of claim 8, wherein the size of each of the batches is chosen to fully optimize the time period it takes the selected print job to be fully processed.

* * * * *